(No Model.)
C. J. BOND.
TYPE WRITING MACHINE.
No. 509,067.  Patented Nov. 21, 1893.
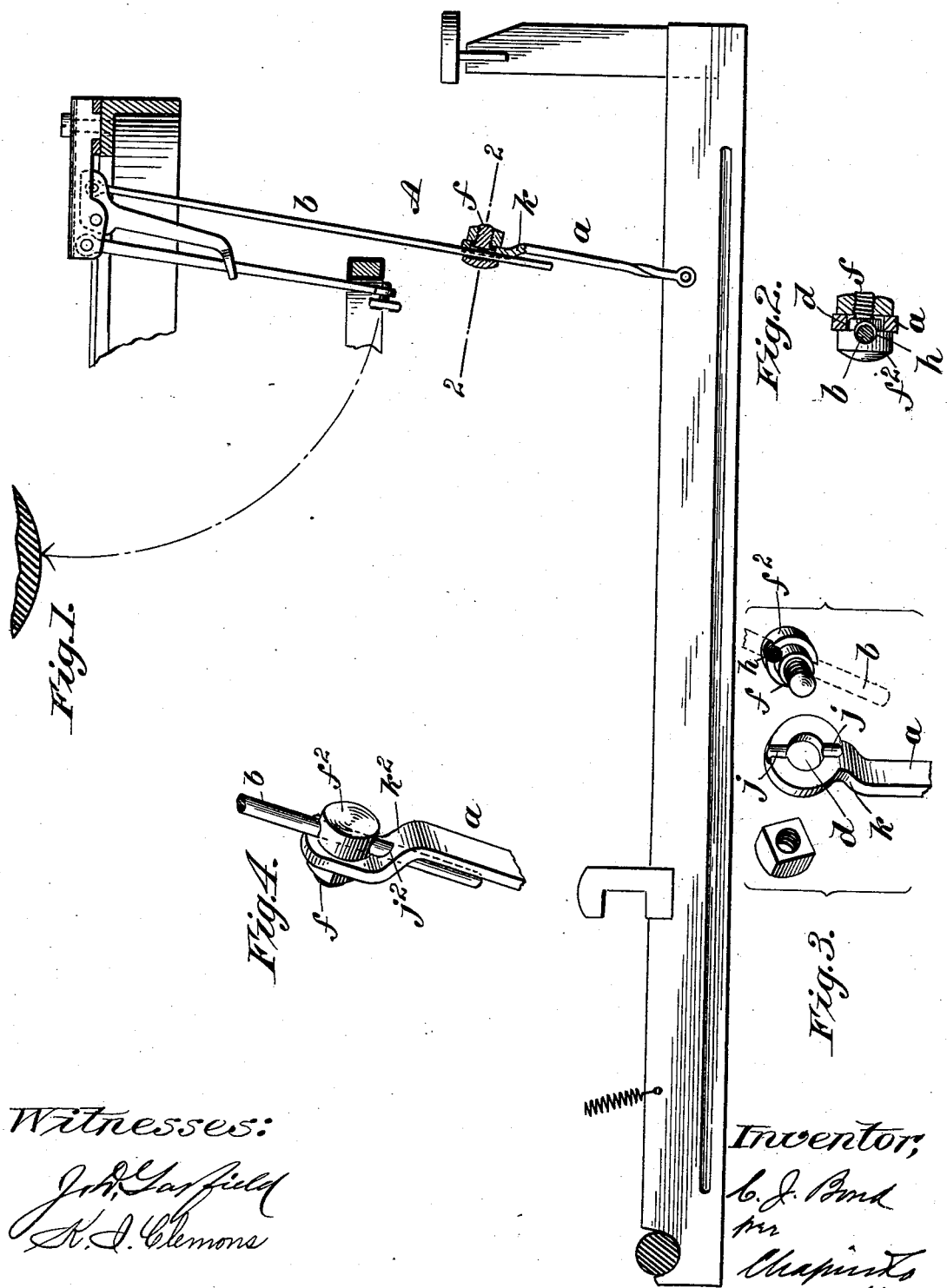

UNITED STATES PATENT OFFICE.

CHARLES J. BOND, OF SPRINGFIELD, MASSACHUSETTS.

TYPE-WRITING MACHINE.

SPECIFICATION forming part of Letters Patent No. 509,067, dated November 21, 1893.

Application filed January 13, 1893. Serial No. 458,266. (No model.)

*To all whom it may concern:*

Be it known that I, CHARLES J. BOND, a citizen of the United States, residing at Springfield, in the county of Hampden and State of Massachusetts, have invented new and useful Improvements in Type-Writing Machines, of which the following is a specification.

This invention relates to improvements in extensible connecting-rods. Connecting-rods of this class are advantageously used between the key-levers and type-bars of typewriting machines, the slight alteration in the length of the connecting-rod being found very desirable, if not absolutely necessary, in deriving the uniformity of adjustment for securing from a given impulse at the key-lever the properly forcible and extended throw of the type-bar. The connecting-rod is, moreover, susceptible of advantageous employment between other movable parts of a typewriting machine,—as between the carriage escapement and the shift-lever therefor,—and manifestly the connecting-rod is not necessarily limited to its embodiment in a typewriting machine.

In the accompanying drawings the improved construction of connecting-rod, and a practical manner of application thereof, are illustrated,—Figure 1 being a side elevation with parts in section showing a key-lever and type-bar and the improved connecting-rod therebetween. Fig. 2 is a cross sectional view of the connecting-rod taken on line 2—2, Fig. 1. Fig. 3 is a perspective view of the writing parts of the connecting-rod separated from each other. Fig. 4 is a perspective view of the connecting rod slightly modified with respect to features which will hereinafter be referred to.

The invention consists, primarily, in the combination in an extensible connecting-rod with one rod-section which has a transverse hole and the screw having the shank passed therethrough receiving thereon the nut, of the other rod-section engaged by the screw-head to be clamped thereby against the first rod-section all whereby the one section is positively held in its given longitudinal relation to the other by the tightening of the nut against the side of the transversely apertured section.

The invention, as preferably carried out, is illustrated in Figs. 1, 2 and 3, and A represents the improved connecting-rod as a whole, $a$ being the one section thereof and $b$, the other section. The rod-section, $a$, has through its extremity an eye or cross hole, $d$, through and beyond which is passed the shank or necked-down portion of the screw, $f$, the head, $f^2$ of which bears by its inner side against the side of the rod-section bordering the perforation. The screw has the hole, $h$, transversely of its axis, and a portion of the diametrical extent of this hole penetrating the necked-down portion of the screw next within the head and the extended threaded shank receives the set-nut which bears against the side of the rod-section opposite that on which the screw-head bears. The rod-section, $b$, is passed transversely through the cross-hole in the head, its direction being usually parallel with the length of the other section, $d$, and in order that the one section may not turn upon the other, or permit the screw to turn as the nut is being tightened, the section, $a$, is longitudinally grooved, as seen at $j$, in which lies the contiguous portion of the section, $b$, as to a slight part of its width. The wall forming the boundary of the hole, $h$, is preferably roughened or serrated so that liabilty of endwise slip of the clamped rod-section, $b$, will be lessened. This roughening may be most practicably performed by screw-tapping the hole.

In order that long grooving may not be necessary for the purpose stated to be subserved by the groove, $j$, and so that the one rod-section may not be prevented from free endwise adjustment at will relative to the other, even if the connecting-rod-sections, one or both, may become unduly bent, the extremity of the one rod-section is slightly offset, as seen at $k$, in Figs. 1 and 3.

In Fig. 4 the rod-section, $a$, in lieu of having the sidewise portion longitudinally grooved, is indicated as formed with a sharp transversely bent portion, $k^2$, adjacent the portion penetrated by the screw. The rod-section, after being passed through the perforation in the head of the screw (which perforation in this case need not, as to any portion of its width, penetrate the necked-down part or shank of the screw) is extended with a close fit through the hole, $j^2$, in said offset portion, and by this engagement with a perforation instead of a groove in the rod-section, $a$, the one section is held in its constant longitudinal relation to the other.

Having thus described my invention, what I claim, and desire to secure by Letters Patent, is—

1. In an extensible connecting-rod, the combination with the one rod section, which is transversely apertured, and the screw having its shank passed through the said section receiving thereon the nut and having its head recessed, and the other rod-section having a sliding engagement with the said recessed head and adapted to be held clamped to the other section by the tightening of the nut, for the purpose set forth.

2. In an extensible connecting-rod, in combination, two sections, one having a transverse perforation, a screw with its threaded shank extended through the perforation in the connecting-rod-section and having its head in bearing against the side of the section and having a cross hole penetrating the head next to the shank, said hole having such a width as to also penetrate the attenuated portion next to the head, the other rod-section passed through the said cross hole and the nut to engage the screw and draw it to clamp and bind the one section upon the other, substantially as described.

3. In an extensible connecting-rod, the combination with a rod-section having its extremity perforated and longitudinally grooved, of the screw with the perforation, the other rod-section having its extremity passed through said perforation transversely in the screw and having an engagement with the grooved portion of the other rod-section and the binding nut, substantially as and for the purpose set forth.

4. In an extensible connecting-rod, the combination with a rod-section having its extremity transversely perforated and also offset, as shown, and longitudinally grooved, of the screw with the perforation, the other rod-section having its extremity passed through said perforation transversely in the screw and having an engagement with the grooved portion of the other rod-section and the binding nut, substantially as and for the purpose set forth.

CHAS. J. BOND.

Witnesses:
WM. S. BELLOWS,
J. D. GARFIELD.